United States Patent Office 2,732,325
Patented Jan. 24, 1956

2,732,325

MODIFIED DIAMINOTRIAZINE-ALDEHYDE RESINOUS COMPOSITIONS AND PRODUCTS COMPRISING THE SAME

Richard Lindenfelser, Darien, and Martha Katherine Kilthau, Stamford, Conn., assignors to American Cyanamid Company, New York, N. Y., a corporation of Maine No Drawing. Application June 18, 1953,
Serial No. 362,677

17 Claims. (Cl. 154—121)

This application is a continuation-in-part of our copending application Serial No. 140,564, filed January 25, 1950, now abandoned.

This invention relates broadly to modified aminotriazine-aldehyde resinous compositions and to products comprising the same. More particularly the invention relates to such resins which have been modified, specifically plasticized, with a particular polyvinyl compound and which are especially adapted to form craze-resistant surfaces on structural articles such, for example, as fiber board, asbestos cement board, wood waste board, Masonite board, laminated cores of resin-impregnated paper, and other compressed or laminated articles or structures. The scope of the invention also includes method features.

The resinous compositions of this invention are of particular value in the production of decorative structures of various kinds. Such structures include laminated articles which are useful in horizontal applications (or so-called "working surfaces") and those which can be employed in vertical applications, e. g., wall paneling and the like.

Extensive use has also been made of so-called "preforms" in the production of laminated materials. A preform usually consists of a single lamination which is built up by felting or some similar operation to form a low density, comparatively thick (¼") sheet which can be compressed to a thinner sheet. As with the laminated cores, resinous surface coatings or one or more resin-impregnated sheets of paper, cloth and the like may be applied to the preform core.

Decorative surfaces on thermoset laminates are customarily produced by utilizing a resin-treated printed paper or wood veneer as the topmost or surface sheet of the laminate; or, if a solid color be desired, by coating the top or surface sheet of the laminate with an intimate dispersion of pigment and fibers in resin. In either case it is often desirable to provide a barrier sheet between the core material and the decorative surface to prevent bleeding of the core resin and a balancing sheet or sheets on the side of the core material away from the decorative surface to prevent warping of the laminate.

The conventional high-pressure laminates, which heretofore have been used in horizontal surface applications such as table tops, restaurant counter tops, bar tops, etc., are usually composed of a laminated core, a print sheet and an overlay sheet. In such laminated articles the core is conventionally built up of a number of plies of paper, specifically kraft paper, which has been impregnated with a phenolic resin, assembled and consolidated under heat and pressure. The function of the core is to impart rigidity to the structure, using a minimum amount of core material, and to do this at the lowest possible cost. These objectives are generally attained by using a low-cost kraft paper, a low-cost phenolic resin and the lowest possible amount of phenolic resin as an impregnant for the kraft paper. The print sheet supplies the decorative effect to the laminate and, in preparing the assembly for lamination, is placed on top of the sheets constituting the core.

The print sheet is generally composed of pure alpha-cellulose paper, absorbent regenerated cellulose paper, etc., on which either has been printed a design or which has been dyed or pigmented to give a solid color to the paper. The printed designs have unlimited range of form or artistic effect so long as the inks that are used are non-bleeding in the resin solution. The print sheet also is treated with a resin, generally heretofore with a melamine-formaldehyde resin. Insofar as the print sheet is concerned, the most important properties are good appearance and durability. Such properties can be obtained by the use of a melamine-formaldehyde resin, which is capable of imparting hardness, abrasion-resistance, solvent-resistance, and color-stability to the print sheet.

Because of the excessive wear to which horizontal surfaces are generally subjected, it has been the general practice heretofore to impart greater durability to the aforedescribed laminate by applying an overlay sheet over the print sheet. The overlay sheet usually consists of a single sheet of paper, generally alpha-cellulose paper, treated with a melamine-formaldehyde resin. The primary objectives in the use of the overlay sheet are to impart durability to the print sheet without detracting from its appearance. The melamine resins have been widely used as impregnants for the overlay sheet because of their aforementioned desirable properties and, when thus employed, are present therein in a very substantial amount. The resin content of the overlay sheet is customarily about 60 to 70% of the weight of the treated sheet as compared with a conventional resin content of about 50% in the print sheet and a resin content of about 33 to 35% in the core sheets. Although the overlay sheet greatly increases the durability of the laminate, the cellulose contributes a small amount of haze and, as a result, it is necessary to use a relatively thin sheet of alpha-cellulose paper as the overlay sheet. (The overlay paper is customarily about 3 to 4½ mils in thickness as compared with a thickness of about 8 mils for the print sheet and thicknesses of about 8–12 mils for the individual core sheets.) The fiber of the paper also may adversely affect the resistance of the surface to staining.

Attempts were made prior to our invention to provide a surface consisting solely of resin on top of the print sheet, in an effort to obtain durability without loss of transparency. However, this has not been possible with conventional resins (e. g., melamine-formaldehyde resins) because such resins, without the reinforcing effect of cellulose fibers or their equivalent, craze on the surface of the laminated structure. It has previously been suggested that this crazing problem be solved by using a plasticized melamine-formaldehyde resin, but attempts along this line have not been entirely satisfactory.

Reference was made in the third paragraph of this specification to the fact that decorative structures include not only laminated articles which are useful in horizontal applications but also structures which can be employed in vertical applications such as wall paneling and the like. In vertical applications the surfaces do not require the same degree of abrasion resistance and surface resistance as is required in horizontal applications such as table tops. Because of this fact, an overlay sheet is not necessary in producing the laminated body. However, other requirements are imposed on the resin that is used to treat the print sheet, as will be apparent from the following discussion.

Vertical panels are frequently made by applying a resin-impregnated print sheet to a base material other than the laminated core structure described briefly above when discussing laminated articles commonly employed in horizontal applications. Base materials that are used in vertical panels or structures include Masonite wall board, asbestos cement board, wood waste board, plywood, etc., these relatively inexpensive materials being employed in order to keep costs at a minimum. Such base materials have a considerably lower density than laminated cores formed of, for example, kraft paper impregnated with a phenolic resin. As a result, they undergo considerably greater fluctuation of dimensions with changes in temperature and humidity than do the aforementioned laminated cores. Consequently the resin-impregnated print sheet (surface sheet bearing the decorative design) that is applied to such base materials is placed under considerable stress. Many resins, e. g., melamine-formaldehyde resins, are characterized by their high degree of inflexibility, and hence, in structures of the kind just described, print sheets containing such resins generally craze on aging and/or cause warping of the panel or structure. Attempts previously have been made to employ a print sheet containing a melamine-formaldehyde resin in vertical panels with the aid of several, intermediate, phenolic resin-treated core sheets which were assembled between the print sheet and the wall board or other base material. To the best of our knowledge and belief, other prior investigators and workers in the art found it impossible to apply a single urea- or melamine-resin-impregnated print sheet to any of the base materials just described without obtaining surface crazing and/or warping of the laminated article.

As has been indicated hereinbefore, relatively inexpensive resins such as phenol-formaldehyde resins are used, wherever possible, in the production of the laminated core or the preform. However, other thermosetting resins, e. g., urea-formaldehyde and melamine-formaldehyde resins, also may be employed. When laminates with very dark-colored surfaces are to be produced, phenolic resins are sometimes satisfactory even for the surface coating or surface sheet impregnant, but with light-colored surfaces or decorative surfaces utilizing printed paper or wood veneer, a light-colored light-stable resin such as a melamine-formaldehyde resin is used.

In all cases a very hard durable surface is produced but due to the extreme wear to which the decorative surfaces are subjected as a result of their extensive use as table tops, counter tops, bar tops, etc., it is desirable, as was previously pointed out, to apply a protective coating over the decorative surface. However, it has not been possible to apply a pure resin layer for this purpose since, due to their inherent shrinkage and inflexibility, urea resin, melamine resin and other similar resins tend to crack and craze. Accordingly, the problem of how to obtain surface protection without surface crazing has received considerable attention, and various means for solving this problem and accomplishing the desired result have been proposed.

For example, sheets of clear, thermoplastic resin may be applied to laminate surfaces, but thermoplastics are not readily adaptable to thermoset laminating technique. Moreover, even if the sheet were applied in a separate operation, the problem of obtaining good adhesion between the thermoplastic surface sheet and the core is encountered and the laminated article produced is inferior in hardness and resistance to abrasion, heat, solvents, etc. Or, as was previously mentioned, a thin resin-treated paper sheet may be placed on the top of the assembly of dried, resin-impregnated sheets before application of heat and pressure thereto. The resulting laminate is satisfactory for many purposes, but the surface film is never absolutely transparent and its thickness is limited. Finally, in laminates with solid color surfaces, the top sheet may be coated with an intimate mixture of resin, pigment and fibers of cellulose, glass, asbestos, or the like. Initial craze resistance is thereby obtained, although crazing may develop in some instances if the article is subjected to varying atmospheric conditions over a relatively long period of time. However, such laminated articles have reduced gloss and reduced durability and the process for producing them has the disadvantage of the extra steps required for pigmentation.

The present invention provides a solution to the aforementioned problems heretofore encountered, including those previously encountered in constructing decorative vertical panels, due for one reason to the fact that the cured resinous compositions of our invention have considerably greater flexibility than cured melamine-formaldehyde resins. As a result, the practicing of our invention makes it possible to apply a single resin-impregnated print sheet to a structural board such as Masonite board, asbestos cement board, and others of the kind aforementioned, thereby to obtain a decorative surface which is characterized by its excellent stability on aging, including resistance to crazing. In general, the resin content of print sheets impregnated with our new resinous compositions is approximately 50 to 55% by weight of the treated print sheet. If desired, an overlay sheet containing the same or a different resinous composition, e. g., a melamine-formaldehyde resin, may be applied over the print sheet for those applications where it is desired to obtain even greater durability and especially extreme resistance to wear. However, the application of an overlay sheet is not necessary in order to prevent crazing or cracking of the surface.

Other advantages flowing from our invention are given later herein.

It is an object of the present invention to provide new resinous compositions, more particularly new, modified diaminotriazinealdehyde resins, which also may be designated as modified 4,6-diaminotriazine-aldehyde resins.

Another object of the present invention is to provide coating compositions which produce hard, craze-resistant coatings on the surfaces of laminated and other articles.

Still another object of the present invention is the production of articles, e. g., laminated articles, carrying a craze-resistant coating.

A further object of the present invention is the production of clear, translucent or opaque surfaces on laminated articles.

It is a further object of the present invention to provide laminated articles with surfaces which are light-colored and light stable, are resistant to heat, solvents and abrasion, have a high gloss, good durability and smooth surface, and which also can be buffed.

Another object of the present invention is the production of laminated articles, especially light-colored laminates, wherein the binder for the laminae is such as to impart post-formability characteristics to the laminated article.

Other objects of the present invention will be apparent to those skilled in the art from the following more detailed description.

The above and other objects are attained by modifying certain diaminotriazine-aldehyde resins with a partially hydrolyzed polyvinyl acetate or a polyvinyl acetal, having a hydroxyl content of from about 3.5% to about 25%, and by utilizing the resulting curable (thermosetting) resinous compositions in applications such as are set forth herein. The diaminotriazines used in producing the primary resins are those 4,6-diaminotriazines wherein the amino groups attached to the carbon atoms in the 4- and 6-positions are unsubstituted and the carbon atom in the 2-position has attached thereto a critical radical which is selected from the class consisting of (a) acyclic aliphatic hydrocarbon radicals containing from 3 to 9 carbon atoms, inclusive; (b) cycloaliphatic hydrocarbon radicals; (c) aralkyl radicals; (d) aryl radicals; and (e) mono- and di-substituted amino radicals. The radicals of (b), (c), (d) and (e) advantageously are those having not more than 10 carbon atoms and the substituent or substituents attached to the nitrogen atom of the amino grouping of (e) are any of those defined in (a) to (d), inclusive.

Our invention will be described in greater detail in conjunction with the following specific examples which are merely illustrative. It is not intended that the scope of the invention be limited to the details therein set forth. Proportions are given in parts by weight.

EXAMPLE 1

(1) 150 parts of resin "A" prepared as shown below
(2) 50 parts of polyvinyl butyral (hydroxyl content approx. 7%)
(3) 200 parts of benzene-denatured, anhydrous ethyl alcohol
(4) 0.4 part of phthalic anhydride The ingredients of (1), (2) and (4) are dissolved in (3). The resulting solution is knife-coated, using a 36-mil gap, onto gray linen print paper sheets which have been so impregnated with a melamine-formaldehyde resin of 1:2 molar ratio that they contain about 37% resin and about 4.4% volatile material. The coated sheets are oven-dried, and the dry spread of the coating composition is observed to be 18.8 g. per square foot. The total volatile content is 4.7%.

The dry, coated sheets are used as outside plies on a core of 12 plies of phenolic laminating stock. Laminates are made by pressing the assemblies for 15 minutes at 150° C. and 1100 p. s. i. The resulting products, which have good appearance and gloss, have a Taber abrasion resistance of 19–21 milligrams loss per 1000 cycles.

EXAMPLE 2

(1) 75 parts of resin "A" prepared as shown below
(2) 25 parts of polyvinyl butyral (hydroxyl content approx. 7%)
(3) 20 parts of ethyl lactate
(4) 80 parts of methyl isobutyl ketone
(5) 4 parts of benzoic acid The resin of (1) is dissolved in a mixture of (3) and (4). The polyvinyl butyral of (2) is added to the solution in a Baker-Perkins mixer or similar revolving-arm mixing device, and the mixture is slowly heated to about 100° C. in 15–30 minutes until (2) is completely dissolved. The benzoic acid (curing catalyst) of (5) is then dissolved in the reaction mixture and, holding the jacket temperature at 110°–115° C., solvent is removed under vacuum. After 30 minutes the mixture becomes granular and crumbly. It is then removed from the mixer, spread onto a tray to cool, and finally ground to between about 60 and 200 mesh.

Two hundred and fifty (250) parts of the dry resin prepared above, 400 parts of water and 1 part of the di-2-ethylhexyl ester of sodium sulfosuccinate are milled for 17 hours in a ball mill until the mix is smooth. It is then knife-coated, using a 36-mil gap, onto gray linen print paper sheets which have been so impregnated with a melamine-formaldehyde resin of 1:2 molar ratio that they contain about 49% resin and about 5% volatile material. The coated sheets are oven-dried, and the dry spread of the coating composition is observed to be 16.4 g. per square foot. The total volatile content is 4.6%.

The dry, coated sheets are used as outside plies on a core of 12 plies of phenolic laminating stock. Laminates of good surface appearance and excellent gloss are obtained by pressing the assemblies for 30 minutes at 150° C. and 1100 p. s. i. They have a Taber abrasion resistance of 11 milligrams loss per 1000 cycles.

EXAMPLE 3

(1) 99 parts of resin "A" prepared as shown below
(2) 33 parts of polyvinyl butyral (hydroxyl content approx. 7%)
(3) 108 parts of titanium dioxide
(4) 180 parts of n-butanol
(5) 180 parts of xylene
(6) 5.3 parts of benzoic acid The ingredients of (1), (2) and (6) are dissolved in (4) and (5), after which the titanium dioxide of (3) is added and the ingredients are mixed thoroughly. The mix is then milled on a three-roll paint mill, letting the mix pass through the rolls three times. The pigmented syrup has a pH of about 5.5.

The pigmented syrup is knife-coated, using a 36-mil gap, onto gray linen print paper sheets which have been so impregnated with a melamine-formaldehyde resin of 1:2 molar ratio that they contain about 50% resin and about 4.4% volatile material. The coated sheets are oven-dried for 40 minutes at 105° C. the dry spread being 17.6–20.2 g. per square foot. The total volatile content is 2.6%.

Laminates possessing good gloss and appearance are made by pressing the coated sheets assembled with a core of 12 plies of phenolic laminating stock for 15 minutes at 150° C. and 1100 p. s. i. They show no crazing or discoloration after 10 cycles of steaming and drying, or after 16 hours of baking at 105° C.

EXAMPLE 4

(1) 187.5 parts of resin "B" prepared as shown below
(2) 62.5 parts of polyvinyl butyral (hydroxyl content approx. 7%)
(3) 400 parts of water
(4) 0.5 part of phthalic anhydride All of the above ingredients are milled together for 17 hours at 25° C. in a ball mill. The mix is knife-coated, using a 36-mil gap, onto gray liner print paper sheets which have been so impregnated with a melamine-formaldehyde resin of 1:2 molar ratio that they contain about 49% resin. The coated sheets are oven-dried for 25 minutes at 105° C. The dry spread of the resin is 15.1 g. per square foot, and the total volatile content is 3.7%.

Laminates are made by pressing the dried, coated sheets assembled with a core of 12 plies of phenolic laminating stock for 10–40 minutes at 150° C. and 1100 p. s. i. They have good color and appearance.

EXAMPLE 5

(1) 75 parts of resin "C" prepared as shown below
(2) 25 parts of polyvinyl butyral (hydroxyl content approx. 7%)
(3) 0.5 part of phthalic anhydride
(4) 123 parts of benzene-denatured, anhydrous ethyl alcohol The ingredients of (1), (2) and (3) are dissolved in the denatured alcohol of (4) in a suitable high-speed, homogenizing-type mixer. The solution is then knife-coated, using a 23-mil gap, onto black paper sheets which have been so impregnated with a melamine-formaldehyde resin of 1:2 molar ratio that they contain about 51% resin and about 4.9% volatile material. The coated sheets are dried on a platen at 80° C. for 10 minutes and then in an oven at 120° C. for 2 minutes. The dry spread is observed to be 18.1 g. per square foot, and the total volatile content is 3.6%.

The dry, coated sheets are used as outside plies with 12-ply phenolic core stock. Laminates of good surface appearance are obtained by pressing the assemblies for 40 minutes at 150° C. and 1100 p. s. i. pressure.

EXAMPLE 6

(1) 75 parts of resin "D" prepared as shown below
(2) 25 parts of hydrolyzed polyvinyl acetate (hydroxyl content approx. 7%)
(3) 1 part of phthalic anhydride
(4) 81 parts of benzene-denatured, anhydrous ethyl alcohol The ingredients of (1), (2) and (3) are dissolved in the denatured alcohol of (4) in a suitable high-speed, homogenizing-type mixer. The solution is then knife-coated, using a 16-mil gap, onto black paper sheets which have been so impregnated with a melamine-formaldehyde resin of 1:2 molar ratio that they contain about 45% resin and about 5.2% volatile material. The coated sheets are dried on a platen at 70° C. for 30 minutes and then in an oven at 115° C. for 10 minutes. The dry spread is observed to be 18.5 g. per square foot, and the total volatile content is 2.7%.

The dry, coated sheets are used as outside plies with 12-ply phenolic core stock. Laminates of good surface appearance are obtained by pressing the assemblies for 20 minutes at 150° C. and 1100 p. s. i. pressure.

EXAMPLE 7

(1) 75 parts of resin "E" prepared as shown below
(2) 25 parts of polyvinyl butyral (hydroxyl content approx. 7%)
(3) 0.5 part of phthalic anhydride
(4) 123 parts of benzene-denatured, anhydrous ethyl alcohol The ingredients of (1), (2) and (3) are dissolved in the denatured alcohol of (4) by mixing in a suitable high-speed homogenizing type mixer followed by 16 hours rolling. The solution is then knife-coated, using a 23-mil gap, onto black paper sheets which have been so impregnated with a melamine-formaldehyde resin of 1:2 molar ratio that they contain about 45% resin and about 5.2% volatile material. The coated sheets are dried on a platen at 80° C. for 15 minutes and then in an oven at 115° C. for 15 minutes. The dry spread is observed to be 20.7 g. per square foot, and the total volatile content is 4.0%.

Laminates which are prepared as in Example 6 by pressing assemblies for 10 minutes at 150° C. have a good glossy surface appearance.

Preparation of resin "A"

18.7 parts (0.1 mol) of benzoguanamine
16.2 parts (0.2 mol) of formaldehyde, 37% aqueous solution
0.10 part of 2 N sodium hydroxide The benzoguanamine and formaldehyde are charged to a suitable vessel equipped with means for reflux, and 0.06 part of the sodium hydroxide is added to give a slurry pH of 7.9. The reaction mixture is heated to reflux in 15 minutes and held at reflux, 94° C., for 3 hours and 35 minutes. At this point the solution becomes turbid and hydrophobic. The remaining 0.04 part of sodium hydroxide is then added to adjust the pH of the mixture to 8.1, and the temperature is lowered to 71° C. The reaction mixture is then vacuum-concentrated at 20.5 in. mercury until the batch temperature reaches 120° C. where it is held for 10 minutes. The resin is dumped onto trays and cooled to obtain a clear, dry, brittle resin which is ground to between about 60 and 200 mesh. The resin is infinitely dilutable in benzene-denatured, anhydrous ethyl alcohol.

Preparation of resin "B"

A more highly reacted resin is prepared as follows from the same starting materials as for the preparation of resin "A":

The benzoguanamine and formaldehyde are charged to the reaction vessel and 0.06 part of the sodium hydroxide is added. The mixture is heated to reflux in 25 minutes and held there for 4 hours and 40 mintues when it becomes turbid and hydrophobic. The additional sodium hydroxide is added to adjust the pH of the mixture to 7.5, and the temperature is lowered to 76° C. It is then vacuum-concentrated at 20.5 in. mercury until the batch temperature reaches 125° C. where it is held for 10 minutes. The resin is dumped onto trays, cooled and ground. It is dilutable in benzene-denatured, anhydrous ethyl alcohol to 12% solids at maximum dilutability.

Preparation of resin "C"

1442 parts (7 mols) of N,N-diallylmelamine
1134 parts (14 mols) of formaldehyde, 37% aqueous solution
2 parts of 2 N sodium hydroxide The N,N-diallylmelamine and formaldehyde are charged to a suitable vessel equipped with means for reflux, and the sodium hydroxide is added to give a slurry pH of 8.0. The reaction mixture is heated to reflux in 36 minutes and held at reflux, 980° C., for 55 minutes. At this point the solution becomes turbid and hydrophobic, and has a pH of 8.5. It is vacuum-concentrated at 52 cm. mercury until the batch temperature reaches 120° C. and then at 60 cm. mercury for 50 minutes until the temperature reaches 140° C. The resin is dumped onto trays, cooled and ground.

Preparation of resin "D"

1106 parts (5.5 mols) of phenylacetoguanamine
894 parts (11 mols) of formaldehyde, 37% aqueous solution
3 parts of 2 N sodium hydroxide The phenylacetoguanamine and formaldehyde are charged to a vessel as in the preparation of resin "C," and 1 part of the sodium hydroxide is added. The reaction mixture is heated to reflux in 50 minutes and refluxed for 83 minutes at 98° C. At this point the solution becomes turbid and hydrophobic. The remaining 2 parts of sodium hydroxide are added to raise the pH of the solution to 8.2. The solution is vacuum-concentrated at 52 cm. mercury until the batch temperature reaches 120° C. and then at 60 cm. mercury and 120°–124° C. for 50 minutes. The resin is dumped into trays, cooled and ground.

Preparation of resin "E"

1005 parts (5 mols) of toluguanamine
810 parts (10 mols) of formaldehyde, 37% aqueous solution
3 parts of 2 N sodium hydroxide The toluguanamine and formaldehyde are charged to a vessel as in the preparation of resin "C," and 2 parts of the sodium hydroxide are added to give a slurry pH of 6.5 The reaction mixture is heated to reflux in 35 minutes and held at reflux, 95° C. for 80 minutes. At this point the solution becomes turbid and hydrophobic. The remaining 1 part of sodium hydroxide is added to adjust the pH of the mixture to 8.5 and, starting at 59° C., the solution is vacuum-concentrated at 52 cm. mercury until the temperature reaches 120° C. The resin is dumped into trays, cooled and ground.

The guanamines which are useful as starting materials in the preparation of the above resins may be prepared by reaction of the corresponding nitrile, i. e., benzonitrile, phenylacetonitrile, and the like, with dicyandiamide as described in, for example, U. S. Patent No. 2,302,162 to Zerwick and Brunner.

Certain other aminotriazine resins may be prepared according to conditions set forth in the present specification and substituted for the specific resins of the examples. In general, we have found suitable for our process aldehyde-condensation products of 4,6-diaminotriazines wherein the 2-position carries a substituent of selected molecular weight and configuration. The two amino groups on the triazine nucleus are necessary to ensure the production of a resin which is capable of curing. The substituent in the 2-position governs the compatibility of the resin product with the polyvinyl modifier, their mutual solubility or solubility in organic solvents, and the relative ease with which the resin product may be cured to a hard material. Thus, aminotriazines which may be condensed with aldehydes and the resulting resins plasticized in accordance with our invention may be represented by the following general formula:

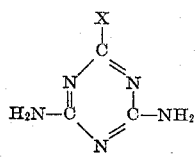

wherein X represents (a) a straight or branched chain, saturated or unsaturated, aliphatic hydrocarbon radical of from 3 to 9 carbon atoms, inclusive, as, for example, n-butyroguanamine, isobutyroguanamine, methacryloguanamine, sorboguanamine, n - valeroguanamine, caproguanamine, heptanoguanamine, capryloguanamine, 4-ethyl-2 - octenoguanamine, etc., or (b) a cycloaliphatic hydrocarbon radical as in, for example, $\Delta^3$-tetrahydrobenzoguanamine, hexahydrobenzoguanamine, 3 - methyl - $\Delta^3$-tetrahydrobenzoguanamine, 3 - methyl - hexahydrobenzoguanamine, 3,4-dimethyl-$\Delta^3$-1,2,5,6 - tetrahydrobenzoguanamine, 3,4 - dimethylhexahydroguanamine, or (c) an aralkyl radical as, for example, phenylacetoguanamine, tolylacetoguanamine, etc., or (d) an aryl radical as, for example, benzoguanamine, the o-, m- and p-toluguanamines, the o-, m- and p-xyloguanamines, the alpha- and beta-naphthoguanamines, etc., or (e) a mono- or di-substituted amino group in which the N-substituent or substituents are any of the substituents of (a), (b), (c), (d) and (e), above, as in, for example, N-butylmelamine, N-tert.-octylmelamine, N-phenylmelamine, N-tolylmelamine, N-cyclohexylmelamine, N,N-diallylmelamine, N,N-dibenzylmelamine, etc.

Mixtures of two, three or any other number of different 4,6-diaminotriazines of the kind embraced by the above formula may be used in place of a single such triazine if desired. Moreover, a minor proportion of the aminotriazine or mixture of aminotriazines may be replaced by other aldehyde-reactive amino compounds such as urea, other aminotriazines including melamine and the like, dicyandiamide, thiourea, guanylurea, guanidine and the like.

While we prefer the use of formaldehyde in aqueous solution for condensation with the above-indicated triazines, other aldehydes or substances yielding an aldehyde, e. g., propionaldehyde, valeraldehyde, paraformaldehyde, acetaldehyde, trioxane, paraldehyde, benzaldehyde, furfural, etc., may be employed. The combined molar ratio of triazine to aldehyde will vary from 1:1 to 1:4, the preferred range being from 1:1.5 to 1:2.5. To obtain light-colored products, aldehydes should be used that impart little or no color to the product, e. g., formaldehyde.

The pH of the condensation reaction involved in the preparation of the triazine resins which we have found compatible with polyvinyl acetals and partially hydrolyzed polyvinyl acetates is not critical and may range from about 4 to about 11, advantageously at a pH of from about 4 to about 9, and usually at a pH of from 6 to 8 or 9. The reaction is continued to the point where the resin solutions are stable upon aging but not beyond the point where the resin becomes insoluble. These limits characterize those resins which are applied to, for example, a print sheet from solution state. In some cases it may be desirable to apply a powdered resin to the print sheet in which case the upper limit of reaction is extended beyond the point of solubility. More particularly the upper limit then becomes that point at which the resin still has adequate flow during the curing cycle so that it can be consolidated on the surface of the laminate thereby to obtain a clear, thermoset resin layer which is integral with the resin-impregnated print sheet.

In the preferred embodiment of the invention the reaction between the aldehyde and the aminotriazine is continued to the point where the resulting condensation product, when dissolved in ethyl alcohol to form a 50% solution (this percentage being based on resin solids), gives a composition which is stable at 20°–25° C. for at least 5 hours; but the reaction is not allowed to proceed beyond the point where the condensation product has a plasticity or flow of about 60 mils as determined by the "Cyanamid test method" hereafter described.

The temperature of the resin-forming reaction should be sufficiently high to ensure dissolution of the initial reaction product in the solvent employed. This minimum reaction temperature is about 60° C. The practical upper limit of the reaction temperature is the reflux temperature of the mass when the reaction is carried out at atmospheric pressure. If high pressures are used, the temperature may be increased, but it should not be above about 200° C. The preferred temperature range is generally from about 80° C. to about 105° C.

The reaction is caused to proceed to the desired endpoint under the pH conditions described previously herein. A buffer may be used in order to maintain the reaction in the preferred pH range, and for this purpose we may use sodium hydroxide, potassium hydroxide, ammonium hydroxide, sodium carbonate, sodium bicarbonate, potassium bicarbonate or other inorganic alkaline salt as well as organic amines such as diethylaminoethanol, triethanolamine, and the like. In general, we prefer adjusting the pH of the reaction slurry with sodium hydroxide.

The endpoint of the aminotriazine-aldehyde condensation reaction also has been discussed briefly hereinbefore, where it was mentioned that the reaction should not be allowed to proceed beyond the point where the condensation product has a plasticity or flow of about 60 mils, as determined by the "Cyanamid test method." This test is conducted as follows:

A charge of fifty grams of the material at 20°–30° C. is placed in the center of the bottom platen of a molding press, both platens of which are at a temperature of 290±2° F. and which are so shaped and grooved as to produce a flat molded disc with concentric ridges the first of which is 1½ inches from the center of the disc, and which are spaced ½ inch apart, and each of which is 1/32 inch high, 1/16 inch wide at the top and with the sides sloping inwardly toward the top at an angle of 30° from the perpendicular. The press is closed in 20 seconds and a force of 18 tons applied in 15 seconds and maintained during the cure time. At the end of the time required for cure, the piece is removed and cooled. The average measurement of the thickness taken in the ring about 2¼ inches from the center of the molded disc is recorded in mils as a measure of the plasticity.

It is essential that the 4,6-diaminotriazine-aldehyde condensation reaction be permitted or caused to proceed at least to the point where a 50% solution of the resin (i. e., resin solids) in ethyl alcohol is stable as evidenced by the absence of any precipitate formation after 5 hours at 20°–25° C.

The actual reaction time for the resin-forming condensation reaction will, of course, be dependent on various factors such as solids concentration, pH, temperature and the like, but it is generally held to from about 10 minutes to about 1 hour. In determining the total heating time both the heating time of reaction and the heating time of concentration must be considered. A simple test may be applied if, as we prefer, the condensation reaction is carried out in an aqueous medium, e. g., an aqueous solution of formaldehyde (formalin). Under these conditions it is then usually only necessary to continue the condensation until the resin that forms becomes hydrophobic.

The condensation reaction may be carried out in the absence of a solvent or diluent or, if desired, in the presence of such solvents or diluents as water or organic solvents including ketones, aldehydes, alcohols, hydrocarbons, esters, ethers, dioxane, etc., which are inert to, or do not form undesirable reaction products with, the resin-forming ingredients and the resin formed. Mixtures of any number of the organic-type solvents or diluents may also be used. We prefer to operate in the presence of water and to avoid the use of alcohols or other hydroxyl-containing solvents or diluents.

Upon completion of the condensation reaction the resin, which will generally be in the form of an aqueous slurry, can be dehydrated, for example, by a spray-drying operation, by kettle dehydration, with or without vacuum, by tray-drying or by drum-drying. If either of the two latter expedients are employed, the resulting friable solid is ground or pulverized. Kettle dehydration is preferred when a solution of the resin is desired, in which case the solvent is added to the molten resin. The polyvinyl plasticizer then may be added or, if desired it may be added later.

Obviously, little or no dehydration will be necessary if no water is present in the resinous mass at the end of the reaction period, for instance when paraformaldehyde or an organic solvent is used in the preparation of the resin.

In order to prevent over-polymerization of the resin during the drying step, its pH should not be too low. It may not be necessary to adjust the pH if the condensation reaction was carried out at a pH above about 7, more particularly at a pH of from about 7 to about 11, but if the reaction was carried out in the pH range of from about 4 to less than about 7, it may be desirable to increase the pH to about 7 to 8.5 during drying.

In practicing our invention all of the triazine and aldehyde to be employed may be reacted initially or, if desired, a portion of the aldehyde may be reacted initially with the triazine and the remaining added during a later stage of the process. If desired, the reaction may be carried out in the presence of the polyvinyl modifier, which may be present from the beginning in the first stage, or it may be added to the aminotriazine resin during or after dehydration of the latter.

In the preferred method of producing our new compositions, the above-described 4,6-diaminotriazine-aldehyde condensation product is blended with a polyvinyl compound (herein sometimes designated as "polyvinyl plasticizer") having a hydroxyl content of from about 3.5% to about 25%, and which is selected from the class consisting of polyvinyl acetals and partially hydrolyzed polyvinyl acetates, thereby to produce the curable resinous compositions of this invention. The proportions of these ingredients which are used are such that the said polyvinyl plasticizer constitutes from about 10% to about 50%, preferably for the usual applications from about 20% to about 40%, of the total weight of said plasticizer and 4,6-diaminotriazine-aldehyde resin.

Our new compositions comprise compatible or substantially homogeneous mixtures of the aminotriazine resins prepared as described above with partially hydrolyzed polyvinyl acetates or with polyvinyl acetals (reaction products of polyvinyl alcohol or a hydrolyzed polyvinyl ester with an aliphatic aldehyde), e. g., the polyvinyl formals, polyvinyl acetals, polyvinyl butyrals, etc. We have found that, in order for the polyvinyl plasticizer to be compatible with the aminotriazine resin employed, the polyvinyl compound must have a hydroxyl content between about 3.5% and about 25% and, preferably, between about 4.5% and about 15%. Some suitable polyvinyl plasticizers are listed below:

| Polyvinyl Composition | Polyvinyl Acetate, Percent | Polyvinyl Alcohol, Percent | Polyvinyl Acetal, Percent | Hydroxyl Groups, Percent | Degree of Hydrolysis, Percent |
|---|---|---|---|---|---|
| Partially hydrolyzed polyvinyl acetate | 91 | 9 | | 3.5 | 16 |
| Do | 86 | 14 | | 5.5 | 24 |
| Do | 82 | 18 | | 7.0 | 30 |
| Do | 74-66 | 26-34 | | 10-13 | 43-50 |
| Do | 38-35 | 62-65 | | 24-25 | 76-79 |
| Polyvinyl butyral | <1 | 12 | 87 | 4.6 | |
| Do | <1 | 16-20 | 80-83 | 6.2-7.7 | |
| Do | <1 | 19 | 80 | 7 | |
| Do | <2.5 | 21 | 76.5 | 8 | |

If desired, mixtures of two or more of the polyvinyl plasticizers containing between about 3.5% and about 25% hydroxyl groups may be used in the resinous compositions with one or more of the 4,6-diaminotriazine-aldehyde resins.

The homogeneous blend of the diaminotrizine-aldehyde resin and polyvinyl modifier, specifically plasticizer, or solvent solutions thereof, are particularly suitable for use in producing clear, unfilled surfaces on decorative laminates. In cured state they have good color and clarity and provide a surface which is resistant to wear, crazing, light, heat and staining.

The resin solutions may be applied to the material to be treated either by knife or roll coating. Prior to use a catalyst, e. g., phthalic anhydride or other conventional curing catalyst, advantageously is added to the blend or solution thereof so as to catalyze the cure of the resin. The catalyst advantageously may be added while the resins are being dissolved in the solvent. The amount of catalyst may be varied as desired or as conditions may require but ordinarily is within the range of from about 0.1% to 1 or 2%, or in some cases even as much as 3 or 4%, based on the amount of resin solids in the solution. The minimum amount of catalyst required to give the desired cure rate should be employed, and this is generally a matter of considerable importance where good electrical properties are wanted in the finished structure. Of course, the use of higher percentages of catalyst than that which has been specified hereinbefore is not precluded.

The resinous compositions with which this invention is concerned may be modified by incorporating therein a wide variety of dyes, pigments, fillers and other effect agents. By varying the pigments and dyes it is possible to produce colored materials of many different kinds. Thus, depending upon the effect desired, up to 50% or more of such pigments and dyes as ochre, carbon black, malachite green, Prussian blue, ultramarine, zinc oxide, ferric oxide, zinc sulfide, titanium dioxide, pearlescent material and the like may be added to the resinous composition. In addition to pigments and dyes, which of course also act as fillers, luminous or fluorescent materials as well as cellulosic, glass, asbestos and other fibers may be used for filling purposes.

The compositions of our invention, and which contain a compatible blend of a particular aminotriazine resin and a particular polyvinyl plasticizer, may be formulated in the absence of a solvent, in the presence of water in which case a suspension of resin is obtained, or in the presence of an organic solvent including alcohols, ketones, esters, hydrocarbons, and the like. We prefer formulation in the presence of a non-toxic, low-boiling organic solvent of a polar nature such as, for example, ethanol, methyl ethyl ketone, ethyl acetate, etc.

There are various possible methods for formulation as set forth in the specific examples. The components of the coating composition may be dissolved in a common solvent or they may be dispersed in water either by co-reacting and milling the resin and the polyvinyl plasticizer, or by ball milling the resin and plasticizer in which case only a physical mixture is realized, or by emulsifying the mixture with suitable agents such as the sodium salt of carboxymethyl cellulose. Furthermore, the aminotriazine resin and polyvinyl modifier may be concentrated and comminuted to a soluble resin or a dry, spreadable powder.

The coating composition may be applied by any desired method such as dip-coating, knife-coating, spray-coating, dry spread, or roll-coating, to the base to be coated. In the case of surfacings on laminated articles it is applied to resin-impregnated sheets which are dried and placed on a foundation body to become the outside plies of the laminate.

The coating compositions advantageously are cured at a pH of from about 3.0 to about 6.0 and, accordingly, it is often necessary to add a curing catalyst, which is usually an acidic or potentially acidic catalyst. This may be an organic acid such, for example, as benzoic acid, salicylic acid, phthalic acid and the like, or it may be a mineral acid such, for instance, as hydrochloric acid. Again, as in the preparation of the aminotriazine resin itself, it may not be necessary to add any additional acid to the composition if the resin was dried or finished off at a sufficiently low pH. Time of cure will vary with temperature and with the particular triazine resin used. Thus, we prefer to use benzoguanamine and N,N-diallylmelamine resins because they cure more rapidly than, for example, a phenylacetoguanamine resin. However, our invention is not limited to the production and use of the more rapidly curing resins.

The resinous compositions of the present invention may be applied to laminated articles and molded articles, or they may be used as adhesives or as coating compositions generally. The compositions are particularly applicable to the production of clear and pigmented surfaces on laminated articles. Laminated articles possessing such craze-resistant surfaces are suitable for use in the manufacture of, or they can be shaped or formed into, table tops, sinks, dishes, trays, refrigerator panels, luggage, bathroom and kitchen furniture or, in fact, any application which demands a hard, craze-resistant, durable, light-colored and light-stable surface finish.

It is an advantage of the present invention that the plasticized aminotriazine resin compositions also can be used advantageously for molding. The molding compositions are characterized by improved flow, toughness and reduced sensitivity to overcure. A particular application of this use of the plasticized resin is in the production of small, transparent, opalescent or pearl-like molded objects such as buttons. Similar advantages are evident when the plasticized resin is used as an adhesive or as a laminating composition.

The resinous compositions of our invention are especially suitable for use in producing post-formable laminated articles comprising superimposed sheets of fibrous material such as paper, glass cloth, or cloth formed of silk, wool, cotton, rayons, etc., or cloths produced from synthetic fibers, e. g., fibers of nylon, polyacrylonitrile (or copolymers of acrylonitrile), vinyl chloride-acrylonitrile copolymers, vinyl chloride-vinylidene chloride copolymers, etc. In such structures the sheets are impregnated and bonded together with our resinous material, which is in cured state. The scope of the invention also includes articles of manufacture comprising the post-formable laminated article which has been post-formed to a desired shape. Our invention also includes within its scope the method which comprises impregnating fibrous sheet material with liquid compositions of the kind herein described, drying the impregnated material, superimposing the dried sheets, bonding the superimposed sheets together under heat and pressure thereby to obtain a laminated sheet article, and deforming the laminated article while hot to a desired shape. The post-formable article may be post-formed to a desired shape, e. g., in the form of a helmet liner. Another post-forming application is in the production of, for example, decorative counter tops wherein the decorative effect is continuous over the forward edge and, also, over the upwardly extending or vertical rear portion.

Another advantage flowing from our invention resides in the fact that laminated articles with good buffing characteristics can be produced; that is, laminates with surfaces which readily and effectively can be buffed to remove scratches or marred portions resulting from the molding operation or during subsequent handling.

We claim:

1. A resinous composition comprising a compatible blend of (1) an uncured resinous product of reaction of ingredients comprising (A) an aldehyde and (B) a 4,6-diaminotriazine wherein the amino groups attached to the carbon atoms in the 4- and 6-positions are unsubstituted and the carbon atom in the 2-position has attached thereto a radical selected from the class consisting of (a) acyclic aliphatic hydrocarbon radicals containing from 3 to 9 carbon atoms, inclusive, (b) cycloaliphatic hydrocarbon radicals, (c) aralkyl radicals, (d) aryl radicals and (e) mono- and di-substituted amino radicals, the substituent or substituents attached to the nitrogen atom of the amino grouping of (e) being any of those defined in (a) to (d), inclusive, the aldehyde of (A) and the 4,6-diaminotriazine of (B) being employed in a molar ratio of about 1:1 to about 4:1 and the said ingredients of (A) and (B) being caused to react at a temperature of from about 60° to about 200° C. until a condensation product is formed, a 50% solution of which in ethyl alcohol is stable at 20°–25° C. for at least 5 hours, but the reaction not being allowed to proceed beyond the point where the condensation product has a plasticity of about 60 mils as determined by the Cyanamid test method, and (2) from about 10% to about 50%, based on the total weight of (1) and (2), of a polyvinyl plasticizer having a hydroxyl content of from about 3.5% to about 25% and selected from the class consisting of polyvinyl acetals and partially hydrolyzed polyvinyl acetates.

2. A resinous composition as in claim 1 wherein the aldehyde of (A) is formaldehyde.

3. A resinous composition as in claim 1 wherein the 4,6-diaminotriazine is benzoguanimine.

4. A resinous composition as in claim 1 wherein the 4,6-diaminotriazine is toluguanamine.

5. A resinous composition as in claim 1 wherein the 4,6-diaminotriazine is phenylacetoguanamine.

6. A resinous composition as in claim 1 wherein the 4,6-diaminotriazine is N,N-diallylmelamine.

7. A product comprising the resinous composition of claim 1 and wherein the resin of (1) is in a cured state and is plasticized with the polyvinyl plasticizer of (2).

8. A resinous composition comprising a compatible blend of (1) an uncured resinous product of reaction of ingredients comprising (A) aqueous formaldehyde and (B) a 4,6-diaminotriazine wherein the amino groups attached to the carbon atoms in the 4- and 6-positions are unsubstituted and the carbon atom in the 2-position has attached thereto a radical selected from the class consisting of (a) acyclic aliphatic hydrocarbon radicals containing from 3 to 9 carbon atoms, inclusive, (b) cycloaliphatic hydrocarbon radicals, (c) aralkyl radicals, (d) aryl radicals and (e) mono- and di-substituted amino radicals, the substituent or substituents attached to the nitrogen atom of the amino grouping of (e) being any of those defined in (a) to (d), inclusive, the aqueous formaldehyde of (A) and the 4,6-diaminotriazine of (B) being employed in a molar ratio of about 1:1 to about 4:1 and the said ingredients of a(A) and (B) being caused to react at a pH of from about 4 to about 9 and at a temperature of from about 60° C. to about 200° C. until the condensation product that forms becomes hydrophobic, but the reaction not being allowed to proceed beyond the point where the condensation product has a plasticity of about 60 mils as determined by the Cyanamid test method, and (2) from about 10% to about 40%, based on the total weight of (1) and (2), of a polyvinyl plasticizer having a hydroxyl content of from about 3.5% to about 25% and selected from the class consisting of polyvinyl acetals and partially hydrolyzed polyvinyl acetates.

9. A resinous composition as in claim 8 wherein the polyvinyl plasticizer is a partially hydrolyzed polyvinyl acetate with a hydroxyl content of from about 4.5% to about 15%.

10. A resinous composition as in claim 8 wherein the polyvinyl plasticizer is a polyvinyl butyral with a hydroxyl content of from about 4.5% to about 15%.

11. A composition as in claim 8 which additionally includes a catalyst for accelerating the cure of the resinous reaction product of (1).

12. A process of producing a laminated product having a craze-resistant surface which comprises applying to a core a surface sheet coated with a resinous composition as in claim 1, and consolidating the assembly under heat and pressure.

13. A process of producing a laminated product having a hard, clear, craze-resistant surface which comprises applying to a laminated core a surface sheet coated with a resinous composition as in claim 1, and consolidating the assembly under heat and pressure.

14. A process of producing a laminated product having a hard, clear, craze-resistant surface which comprises applying to a preform a resinous composition as in claim 1, and consolidating the assembly under heat and pressure.

15. A heat- and pressure-consolidated laminate having a hard, craze-resistant surface and which comprises a core having bonded thereto a surface sheet on which there is a coating of a cured resinous material, said material in uncured state being a resinous composition as in claim 1.

16. An article having a craze-resistant surface which comprises a cured resinous material, said material in uncured state being a resinous composition as in claim 1.

17. A product comprising the resinous composition of claim 8 and wherein the resin of (1) is in a cured state and is plasticized with the polyvinyl plasticizer of (2).

References Cited in the file of this patent

UNITED STATES PATENTS

| | | |
|---|---|---|
| 1,454,845 | Clay | May 15, 1923 |
| 1,597,539 | Novotny et al. | Aug. 24, 1926 |
| 1,697,182 | Hall et al. | Jan. 1, 1929 |
| 2,318,121 | Widmer et al. | May 4, 1943 |

FOREIGN PATENTS

| | | |
|---|---|---|
| 480,316 | Great Britain | 1938 (printed) |

OTHER REFERENCES

Plastics, "Laminating with Melamine Resins," Noble, December 1946, pp. 46–49, 94 and 95.